United States Patent Office 3,095,791
Patented July 2, 1963

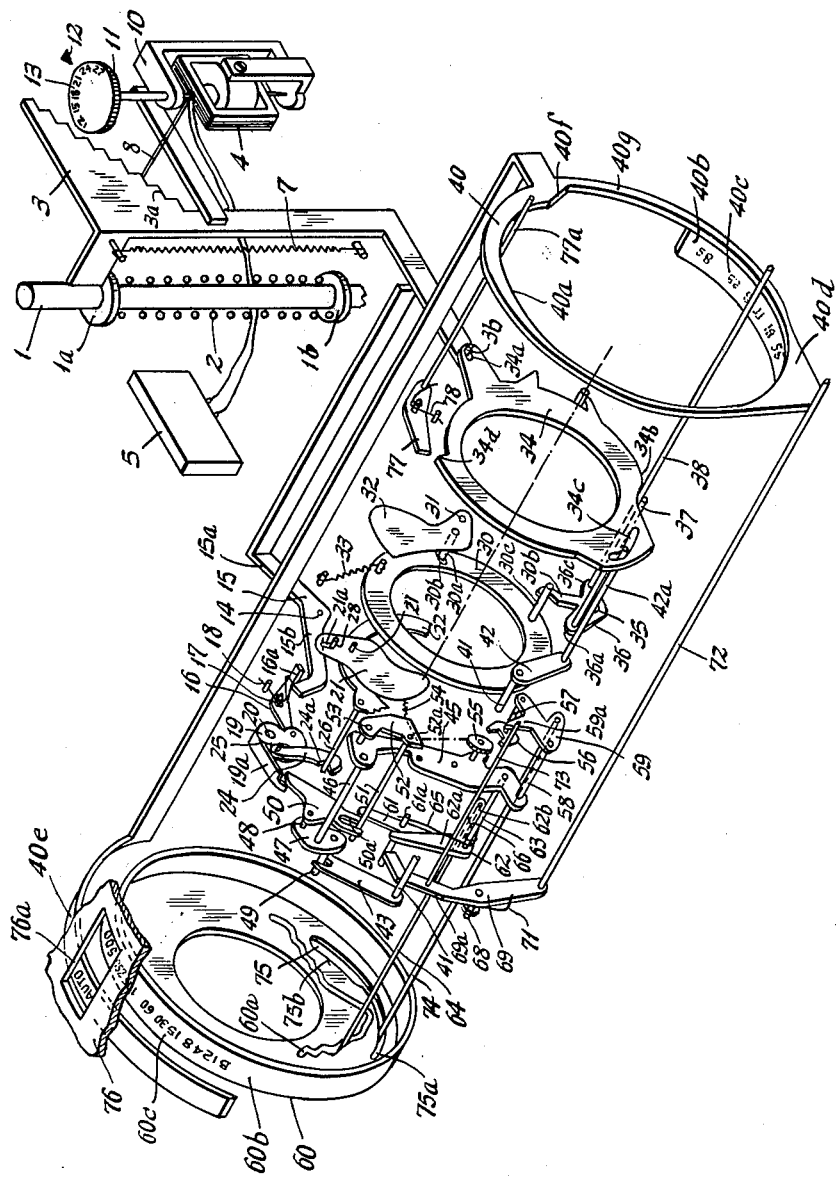

3,095,791
PHOTOGRAPHIC CAMERA HAVING A BUILT-IN
EXPOSURE METER
Carl Fritz Richter, Calmbach (Enz), Germany, assignor to
Alfred Gauthier, G.m.b.H., Calmbach (Enz), Germany,
a corporation of Germany
Filed July 25, 1962, Ser. No. 212,392
Claims priority, application Germany July 29, 1961
5 Claims. (Cl. 95—10)

This invention relates to a photographic camera having a built-in exposure meter and means for setting the camera for either manual operation or automatic operation in response to the light intensity.

The object of the present invention is to provide a photographic camera having a built-in exposure meter in which the diaphragm and the exposure time setting mechanism are operable in response to a manual setting or automatically in response to the light intensity which is efficiently operable under all conditions and which is constructed in such fashion that the operator is always completely aware of the conditions under which the camera is operating.

The object of the invention is attained by the provision of a movable member and another manually operable setting member which cooperate with the exposure time escapement mechanism to effect a manually determined setting of the diaphragm and exposure time when the camera is set for manual operation while nevertheless having means acting in response to the light intensity for automatically accomplishing the appropriate exposure when the camera is set in the automatic position. The invention provides an adjusting device which is operatively engaged with the manually operable exposure time setting member and the exposure escapement mechanism when the camera is set for manual operation with the said adjusting device being inoperative when the camera is set for automatic operation in response to the light intensity in which latter setting the escapement mechanism is operated by a novel drive arrangement controlled by the automatic setting member.

A feature of the present invention resides in the construction provided whereby the desired settings may be accomplished in a simple and efficient manner utilizing a minimum number of parts and with the setting indicia being clearly and distinctly visible to the user to eliminate any errors in operation. In accordance with the invention, to change the camera from manual to automatic operation it is only necessary to move the movable member from the position where the manual indicia are visible to the position where the automatic marking is visible. The same exposure time setting structure is utilized in each position and the movement of the movable member to the automatic position also displaces the adjusting device which cooperates with the setting member for providing the appropriate diaphragm aperture in manually determined position and renders the adjusting device inoperative during the automatic operation of the camera in response to light intensity.

The embodiment of the invention hereinafter set forth illustrates an arrangement which operates in a positive and efficient manner. In the arrangement the adjusting device comprises two cooperating levers, the first of which determines the starting position of the escapement mechanism brake and tensionally engages the second lever when the camera is set for manual operation. The first lever is moved out of the path of movement of both the brake and the second lever when the camera is set for automatic operation in response to light intensity.

According to the present invention, the means for setting the camera for manual or automatic operation may be positioned with ease and facility, and only a simple adjustment is required in order to effect either the manual or automatic operation. In addition, the position of the setting member is made clearly apparent to the operator of the camera for the indicia involving manual operation is not visible when the camera is set for automatic operation while being fully exposed to view when the camera is set for manual operation.

Other details, features and advantages of the present invention are set forth in the accompanying specification in conjunction with the accompanying drawing which shows an exploded perspective view of the structural parts providing the means for manual and automatic operation of the camera in accordance with the present invention.

Referring specifically to the drawing a release member 1 or shutter actuation pin is disposed within the camera housing (not shown). The release member is provided with two collars 1a and 1b. A compression spring 2 is located intermediate the collars 1a and 1b and normally urges the release member or shutter actuating pin into the position wherein the release member extends outside of the housing. When the automatic exposure setting is used the release member cooperates with the sensing member 3 which is provided with stepped cams 3a at one end and a pin 3b at the other end. The sensing member 3 is constructed in the form of a driving slide in parallel relation to the release member. The sensing member 3 moves in response to the movement of the light measuring means 4 which is part of a built-in exposure meter controlled by a photo electric cell 5. A spring 7 normally urges the sensing member 3 into engagement with the collar 1a on the release member 1. The release member is not moved thereby for the reason that the spring 7 is not as strong as the coil spring 2.

When the release member is depressed to take a picture the collar 1a is moved from the position on which it supports the sensing member 3. Under the influence of spring 7 the sensing member is then urged downwardly toward a pointer or indicator 8 provided on the light measuring means 4 until one of the cam surfaces 3a rests on the pointer whose position is originally determined by the light intensity. A U-shaped supporting member 10 carries the measuring member 4 and is movable to various predetermined positions by movement of a disc 11. The disc 11 is provided with indicia showing the sensibility value of film used in the camera and the disc may be moved to the proper position wherein the appropriate film sensibility indicia 13 is set opposite the fixed mark 12.

A two-armed release lever 15 which is adapted to be operatively engaged by the collar 1b of the release member 1 is pivotally positioned about a fixed axis 14. The arm 15a of the release lever is angularly disposed with relation to the arm 15b. An arresting lever 16 provided with a bent-off lug 16a is pivotally mounted about fixed axis 17. The arresting lever engages the arm 15b of the release lever 15 with its lug portion 16a and the engagement is maintained under the influence of the arresting lever by a spring 18 which normally urges the arresting lever 16 into contact with the release lever 15. A shutter driving member 19 provided with a projecting arm 19a is disposed about a shaft 20. The shaft is coupled to an actuating device (not shown) which may be, for example, the film transporting device of the camera. The driving member 19 is maintained in cocked position by the arresting lever 16.

The shutter blades 21, provided with slots 21a, are reciprocally moved by a driving ring 22 which is disposed coaxially with the lens axis of the shutter. A driving pawl 24, having coupling jaws 24a, is articulately connected to the driving member 19 and under the influence of spring 25 is able to move the driving ring 22 by means of the engagement of the coupling jaws 24a with the fixed pin 26 on the driving ring 22. The shutter blades 21 (only one of which is shown for clarification purposes) are pivotally mounted on pins 27 carried by the driving ring 22. Upon movement of the driving member 19, the shutter blades are operated through the motion transmitted by the driving pawl 24 and the shutter driving ring 22. The movement of the shutter blades is a reciprocating motion whose path is determined by the fixed pins 28 in the slots 21a provided in the shutter blades 21.

A diaphragm actuating member 30, constructed in the form of a ring, is provided with a slotted portion 30b which is adapted to accommodate a pin 30a disposed on and projecting from the diaphragm lamellae 32. The diagram lamellae are pivotally movable about fixed pin 31. The diaphragm actuating ring 30, which is arranged coaxially with the lens axis of the shutter, is maintained under the influence of spring 33, in position in which the lamellae 32 are open. An annular automatic setting member 34, also located coaxially with the lens axis of the shutter, is provided with a slotted portion 34a adapted to accommodate pin 3b on sensing member 3 whereby an operative connection is established between the sensing member 3 and the automatic setting member 34. The annular setting member 34 accomplishes the automatic exposure setting of the diaphragm when the camera is set for automatic operation. The setting member is provided with a cam surface 34b and a cam slot 34c.

A three-armed pivotally movable lever 36 is disposed about axis 35 intermediate the annular setting member 34 and the diaphragm actuating ring 30. The three-armed lever provides for the transmittal of motion from the setting member 34 to the actuating member 30 to adjust the setting of the actuating member 30. One arm 36a of the movable lever 36 is provided with a laterally extending rod 37 which engages the cam surface 34b of the setting member 34. Another arm 36b of the pivotal lever 36 engages a pin 30c extending from the diaphragm actuating ring 30. The third arm 36c of the lever 36 carries an elongate rod 38 which operatively engages the diaphragm setting member 40 which, in turn, operates to effect the manual setting of the diaphragm. This operative engagement is accomplished by means of a cam surface 40a provided on the diaphragm setting member 40. The diaphragm setting member 40 is also provided with an arcuate plate 40b whose outer surface is marked with diaphragm scale indicia 40c.

The automatic setting of the exposure time in response to the light intensity is accomplished by means of a shaft 41 located in parallel relation to the lens axis and one end of which is fixed to an extremity of lever 42. A pin 42a is disposed at the other extremity of the lever and is accommodated in the cam slot 34c of the annular setting member 34. The other end of the shaft 41 carries a second lever 43 which is so constructed as to prevent relative rotation therebetween. The free end of the lever 43 is in operative engagement with a component of the exposure time escapement mechanism hereinafter described.

The escapement mechanism comprises a base plate 45 which carries at one end a laterally extending pin 46. The other end of the pin 46 is secured to a two-armed lever 47. Pins 48 and 49 extend in opposite directions on each of the arms which respectively comprise the two-armed lever 47. A brake lever 50 is pivotally positioned about the pin 48 and engages the projecting arm 19a of the driving member 19. Opposite the point of such engagement, the brake lever 50 is provided with a guide slot 50a adapted to accommodate a pin 51 located on a driving segment 52 of the escapement mechanism.

One end of the driving segment is pivotally mounted on a pin 53 extending from the base plate 45 and under the influence of spring 54 is maintained in a position in which the rod 51 engages the base plate 45. The other end of the driving segment 53 is provided with an arcuate serrated portion which is engaged by a gear arrangement indicated only by the dot and dash lines in the drawing. A ratchet wheel 55 is in contact with the gear arrangement and in disconnectable association with an anchor plate 56. The anchor plate 56 is rotatably mounted on a bearing pin 57 carried by a movable lever 59 which is mounted on a pin 58 carried by the base plate 45. As indicated by the drawing the two-armed lever 47 which engages the brake lever 50 by means of the pin 48 is operatively connected to the cam surface 34b through the medium of the fixed shaft 41, lever 42, pin 42a, lever 43 and pin 49. This connection is established in such fashion that upon the movement of the setting member 34 the position of the brake lever 50 is changed in respect to the position of the driving member 19. When it is desired to set the exposure time escapement mechanism (comprising the parts designated by the numerals 47 through 59) by means of the manually operable setting member 60 to provide for the manual setting of the exposure time, the aforementioned gear arrangement is rendered inoperative. For this purpose an adjusting device is provided in operative association with the escapement mechanism members. The adjusting device comprises lever 61 and two-armed lever 62 which are located about a common shaft 63. The lever 61 is adapted to adjust the setting position of the brake lever 50 when the camera is set for manual operation. To accomplish this adjustment, the lever 61 engages the driving pin 51 carried by the brake lever 50. The lever 61 is provided with a driving pin 61a which extends, as shown, from both sides thereof. One of the projecting ends of the pin 61a is located in the path of movement of an extending arm 62a disposed on the lever 62. The other arm 62b carries a laterally extending rod 64 which is adapted to be accommodated within the cam slot 60a of the manually operable exposure time setting member 60 whereby an operative connection is established between the arm 62b and the setting member 60. A coil spring 65 is also mounted on the shaft 63 which carries the levers 61 and 62. One end of the coil spring is engaged by a pin 66 carried by the lever arm 62b and the other end of said spring engages the driving pin 61a on lever 61 in such fashion that the levers are normally urged into engagement with each other. The coil spring 65 is stronger than the tension spring 54 influencing the driving segment 52 to negate the influence of the tension spring 54 under normal conditions.

In accordance with the present invention another two-armed lever 69 is provided which is disposed about a fixed shaft 68. The lever 69, when rotated about its axis, impinges the projecting end of the driving pin 61a carried by the lever 61. The setting position of the lever 69 is determined by the manually operable diaphragm setting member 40 which is used both for setting the diaphragm and for changing the operation of the camera from manual to automatic or vice versa. To accomplish this result the diaphragm setting member 40 is provided with a projecting cam 40d and a rod 72 carried by and extending from the lever 69 is supported on said cam. This position is normally maintained by the influence of the spring 71 acting on the said lever 69. The lever 61 of the adjusting mechanism members 61 through 66 is so constructed as to be movable against the influence of spring 65 by movement of the lever 69 when the camera is set at "Auto" position as illustrated in the drawing. In this position the lever 61 is disengaged from the two-armed lever 62 and thus the lever 61 has no effect on the escapement mechanism.

One arm 69a of the lever 69 carries a control rod 73. When the lever 69 is rotated the control rod engages a projection 59a on the lever 59 moving the lever 59 in such fashion as to cause the anchor plate 56 to become disconnected from the ratchet wheel 55. A rod 74 extending from the lever 59 is accommodated within a control slot 75 provided with two control edges 75a and 75b thereby to establish an operative connection between the lever 59 and the manually operable exposure time setting member 60. The control edges 75a and 75b are so constructed that the anchor plate 56 becomes disengaged from the ratchet wheel 55 when the camera is set at exposure times in the range of $\frac{1}{30}$ to $\frac{1}{500}$ of a second in which position the control edge 75a is operative. When setting the exposure times for a longer duration than $\frac{1}{30}$ of a second the pin 74 is moved to a position opposite the control edge 75b in which position the anchor plate 56 is rendered operative. In a well known manner, the lever 59 may cooperate with the shutter blade driving ring 22 in such fashion that the anchor plate 56 is disconnected when the driving ring 22 is in inoperative position.

An exposure time scale 60c is provided on the cylindrical surface area 60b of the exposure time setting member to indicate the appropriate settings. The cylindrical surface area may be enclosed within a casing 76 only a portion of which is shown in the drawings. The casing is affixed to the shutter housing and is provided an apertured portion to form a window 76a through which the exposure time value of the scale 60c becomes visible when the camera is set for manual operation. In order to avoid any confusion on the part of the operator of the camera when the camera is set for automatic operation, an arcuate covering plate 40e, carried by the setting member 40, moves in front of the window 76a and covers the exposure scale values when the camera is set for automatic operation whereupon only the indication "Auto" will be visible through the window.

A locking arm 77 is operatively connected to the diaphragm setting member 40 in the manner hereinafter described. One end of the locking arm is adapted to engage, under certain conditions, the projection 34d provided on the automatic setting member 34. The other end of the locking arm 77 carries a rod 77a which under the influence of coil spring 78 engages the control edge 40a of the setting member 40 when the camera is set for automatic operation. When the setting of the camera is changed to provide for manual operation by means of movement of the setting member 40, the rod 77a passes over the control edge 40f and engages the concentrically extending control edge 40g to move the locking arm into operative position. When the camera setting is changed to automatic operation, by movement of the setting member 40, the locking arm 77 is simultaneously moved to the position shown in the drawing wherein it is out of the path of movement of projection 34d and the cover plate 40e is also moved into position wherein the word "Auto" is visible through the window 76a indicating that the camera is in "automatic" position.

The method of operation of the camera provided by the present invention is as follows:

When the diaphragm and exposure time are to be set automatically, the diaphragm setting member 40 is moved into the position wherein the designation "Auto" is visible through the window 76a of the casing 76. As shown in the drawings, in this position the locking arm 77 is out of the path of movement of the automatic setting member 34. Further, the lever 69 is pivoted about shaft 68 by the action of the projection cam 40d on the rod 72. The movement of the lever 69 moves the lever 61 into a position wherein the lever is without effect or influence upon the exposure time escapement mechanism member 47 through 59. In this setting position of the camera and with the shutter cocked, the depression of the release member 1 disengages the collar 1a from the sensing member 3. Under the influence of spring 7 the sensing member moves downwardly following the movement of the release member 1 and causes the automatic setting member 34 to rotate until such time as one of the steps 3a of the sensing member 3 engages the needle 8 of the movable measuring mechanism 4. The rotary adjusting motion of the automatic setting member 34 is transmitted to move the diaphragm actuating member 30 by reason of the action of cam surface 34b on the rod 37 and the two-armed lever 36. In addition, the adjusting motion of the automatic setting member 34 and its cam slot 34c causes the three-armed lever 47 carrying the brake lever 50 to move as a consequence of the movement of members 41 through 43. Both the diaphragm lamellae 32 and the exposure time escapement mechanism 47 through 59 are thereby ultimately in the setting position corresponding to the time diaphragm program of the automatic setting member 34 initially provided by the light responsive movement of the sensing member. In the illustrative embodiment of the present invention, the time diaphragm program which is determined by the construction of the cams 34b and 34c, extends from the pair: diaphragm 2.8, $\frac{1}{30}$ sec. to the pair: diaphragm 22, $\frac{1}{500}$ sec.

As the camera release member moves downwardly, the collar 1b engages the arm 15a of the lever 15 to thereby move the arresting lever 16 and release the driving member 19 of the shutter for the running down of the exposure.

The driving member 19 rotates about its axis under the action of the driving spring 25 and the projecting arm 19a contacts the brake lever 50 over that distance which is determined by the original setting position of the brake lever 50. The movement of the driving member 19 causes the brake lever 50 to pivot about its axis. Thereafter the driving member 19 becomes disengaged from the brake lever 50 after having traveled that distance which ultimately determines the exposure time. During this operation the movement of the driving member 19 and its driving pawl 24 causes the reciprocal movement of the shutter blade driving ring 22 in the usual manner whereupon the shutter blades open to the maximum aperture and then return to closed position. The running down of the exposure is then concluded and the driving member 19 is returned to its original position for the purpose of obtaining a new exposure. This return may be accomplished, for example, by means of the movement of the film transport device. When the driving member 19 is returned to cocked position it is maintained therein by the arresting lever 16.

When photographs are to be taken, using the manual exposure time and diaphragm setting, the diaphragm setting member 40 is rotated until such time as the desired diaphragm value of the diaphragm scale 40c becomes visible in the window 76a of the casing 76. The cover plate 40e is moved concurrently along with the rotary motion of the diaphragm setting member 40 and disappears entirely from the window 76a thereby exposing the exposure time scale 60c to view. As a result of the rotary motion of the diaphragm setting member 40, the locking arm 77 is moved into the path of motion of the projection 34d on the automatic setting member 34. At the same time, the lever 69 which has operatively associated with the adjusting members 61 through 66 is deflected under the influence of spring 71 into a position in which it will not effect or influence the adjusting members or the lever 59 carrying the anchor plate 56.

After the diaphragm lamellae 32 has been moved to the position which corresponds to the setting of the diaphragm value by the interaction of the three-armed lever 36 and the setting cam 40a of the diaphragm setting member 40 and after the camera is in the range of manual operation, the setting of the exposure time is accomplished by rotating the manually operable exposure time setting member 60. Specifically, the exposure time setting member 60 is rotated in one direction or the other until the scale value corresponding to the exposure time desired is visible through the window 76a of the casing 76. The rotary motion of the exposure time setting member 60 causes the brake lever 50 of the escapement mechanism members 47 through 59 to be influenced by the adjusting members 61 through 66. As a result, the anchor plate 56 of the escapement mechanism is connected or disconnected by movement of the lever 59 after the exposure time value has been set. The locking of the automatic setting member 34 causes the lever 47 to also be maintained in fixed position and, thereby, the pin 48 of the brake lever 50. The action on the brake lever 50 by the exposure time setting member 60 therefore changes or adjusts the angular position of the brake lever. As a consequence, the projecting arm 19a of the driving member 19 impinges upon the brake lever 50 at either an earlier or later point thereby producing a longer or shorter exposure time.

When the camera is set for manual operation the running down of the exposure is started in the usual manner by depressing the camera release member 1. Thereupon the collar 1b on the release member moves the release lever 15 which in turn moves the arresting lever 16 enabling the driving member 19 to become active for running down of the shutter as hereinbefore described.

While the invention has been described in substantial detail it is to be understood that the description and illustration disclose only one embodiment of the invention for exemplary purposes and that variations and modifications may be made without departing from the spirit of the invention or the scope of the appended claims.

I claim:

1. A photographic camera comprising a built-in exposure meter; a shutter; first means to drive said shutter at variable speeds to achieve different exposure times; an adjustable diaphragm; second means to control the aperture of said diaphragm; a first setting member adjustable to an automatic position and to a range of manually controlled positions; a first linkage connecting said setting member to said second means only when said setting member is in its manual range to set said diaphragm manually; an automatic setting member linked to said exposure meter and to said second means to control said diaphragm automatically when said first setting member is set to its automatic position; a second setting member and a second linkage connecting said second setting member to said first means to control the exposure time of said shutter when said first setting member is in its range of manual positions; a third linkage connecting said automatic setting member to said first means to control the exposure time of said shutter when said first setting member is in its automatic position; and fourth means operatively connected with said first setting member to disengage said second linkage when said first setting member is in its automatic position.

2. A photographic camera comprising a built-in exposure meter; a shutter; first means to drive said shutter at variable speeds to achieve different exposure times; an adjustable diaphragm; second means to control the aperture of said diaphragm; a first setting member adjustable to an automatic position and to a range of manually controlled positions; a first linkage connecting said setting member to said second means only when said setting member is in its manual range to set said diaphragm manually; an automatic setting member linked to said exposure meter and comprising first and second cams; follower means engaging said first cam and linked to said second means to control said diaphragm automatically when said first setting member is set to its automatic position; a second setting member and a second linkage connecting said second setting member to said first means to control the exposure time of said shutter when said first setting member is in its range of manual positions; second follower means engaging said second cam and connecting said automatic setting member to said first means to control the exposure time of said shutter when said first setting member is in its automatic position; and fourth means operatively connected with said first setting member to disengage said second linkage when said first setting member is in its automatic position.

3. A photographic camera having a built-in exposure meter, an adjustable shutter and an adjustable diaphragm, said camera comprising: an automatic setting member; first means connecting said automatic setting member to said shutter to adjust the exposure time thereof automatically; second means connecting said automatic setting member and said diaphragm to adjust said diaphragm automatically; a first control setting member movable to an automatic position and to a range of manual positions and operatively controlling said first and second means whereby both the exposure time and diaphragm opening are simultaneously adjusted by said automatic setting member when said control setting member is in its automatic position; a shutter controlling device cooperatively linked to said shutter to control the exposure time thereof manually when said first control setting member is in its manual range; and a lever connected to said first control setting member to be actuated thereby when said control setting member is in its automatic position, said lever engaging said shutter controlling device to render the same inoperative when said first setting member is in its automatic position.

4. A photographic camera having a built-in exposure meter, an adjustable shutter and an adjustable diaphragm, said camera comprising: an automatic setting member; first means connecting said automatic setting member to said shutter to adjust the exposure time thereof automatically; second means connecting said automatic setting member and said diaphragm to adjust said diaphragm automatically; a first control setting member movable to an automatic position and to a range of manual positions and operatively controlling said first and second means whereby both the exposure time and diaphragm opening are simultaneously adjusted by said automatic setting member when said control setting member is in its automatic position; a shutter controlling device cooperatively linked to said shutter to control the exposure time thereof manually when said first control setting member is in its manual range; a lever connected to said first control setting member to be actuated thereby when said control setting member is in its automatic position, said lever engaging said shutter controlling device to render the same inoperative when said first setting member is in its automatic position; a braking lever to control the speed of operation of said shutter; first and second levers, said first lever being operatively positioned to engage said braking lever when said first control setting member is in its manual position; resilient means biasing said levers together, means to move said first lever out of the range of motion of said braking lever and of said second lever when said control setting member is in its automatic position; and means connecting said second lever to said second control setting member for manual control of the exposure time of said shutter when said first control setting member is in its manual position.

5. A photographic camera comprising a built-in exposure meter; a shutter, first means to drive said shutter at variable speeds to achieve different exposure times; an adjustable diaphragm; a first setting member adjustable to an automatic position and to a range of manually controlled positions; a first linkage connecting said setting member to said second means only when said setting member is in its manual range to set said diaphragm manually; an automatic setting member linked to said exposure meter and to said second means to control said diaphragm automatically when said first setting member is set to its automatic position; a second setting member and a second linkage connecting said second setting member to said first means to control the exposure time of said shutter when said first setting member is in its range of manual positions; a time scale and indicator to indicate the exposure time of said shutter; third means connected to said first setting member to cover said time scale when said first setting member is set to its automatic position and to expose said time scale to view when said first setting member is set to its range of manually controlled positions; a third linkage connecting said automatic setting member to said first means to control the exposure time of said shutter when said first setting member is in its automatic position; and fourth means operatively connected with said first setting member to disengage said second linkage when said first setting member is in its automatic position.

References Cited in the file of this patent
UNITED STATES PATENTS

| | | |
|---|---|---|
| 3,013,478 | Gebele | Dec. 19, 1961 |
| 3,037,437 | Rentschler | June 5, 1962 |
| 3,044,376 | Gebele | July 17, 1962 |
| 3,044,377 | Gebele | July 17, 1962 |